Patented Sept. 26, 1933

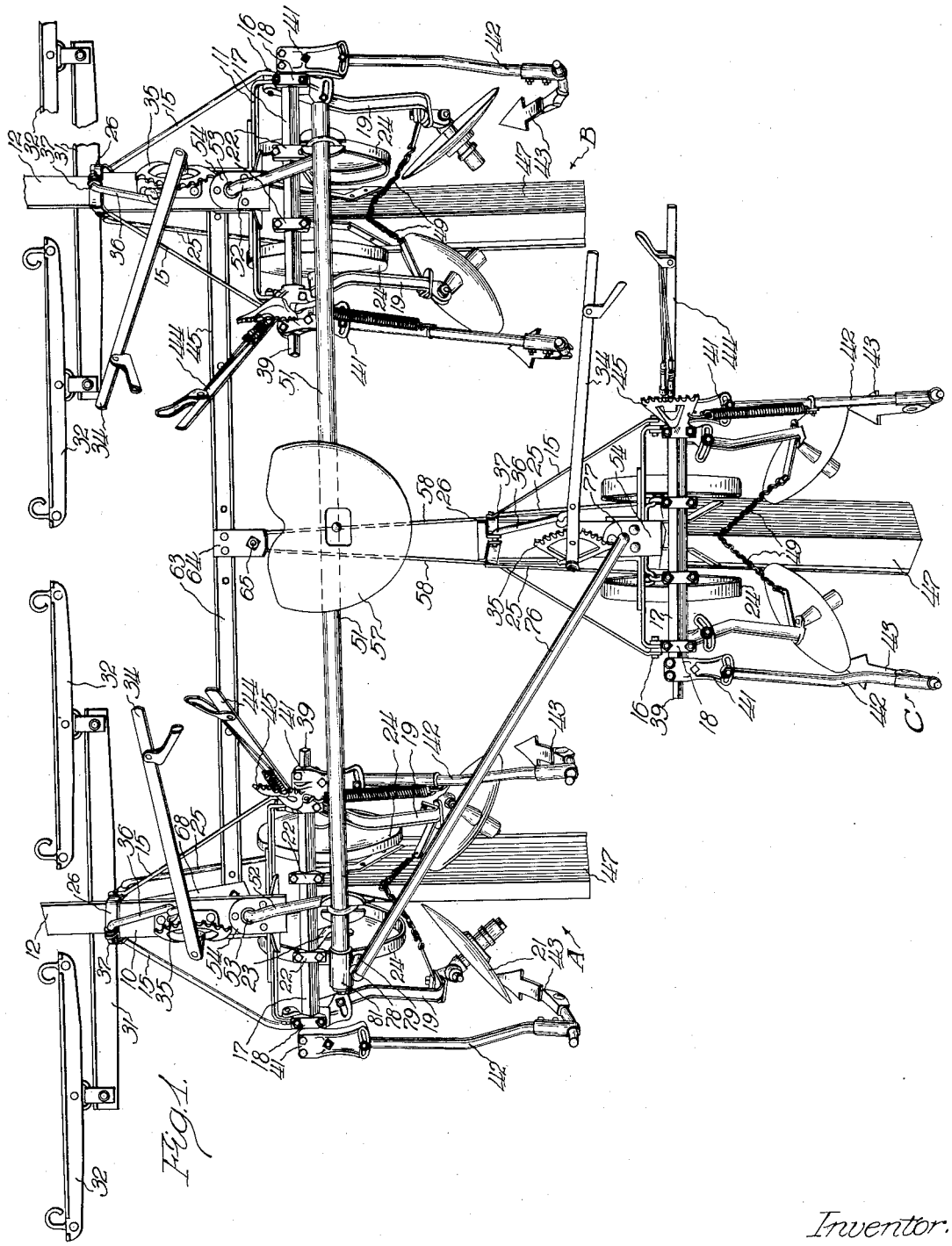

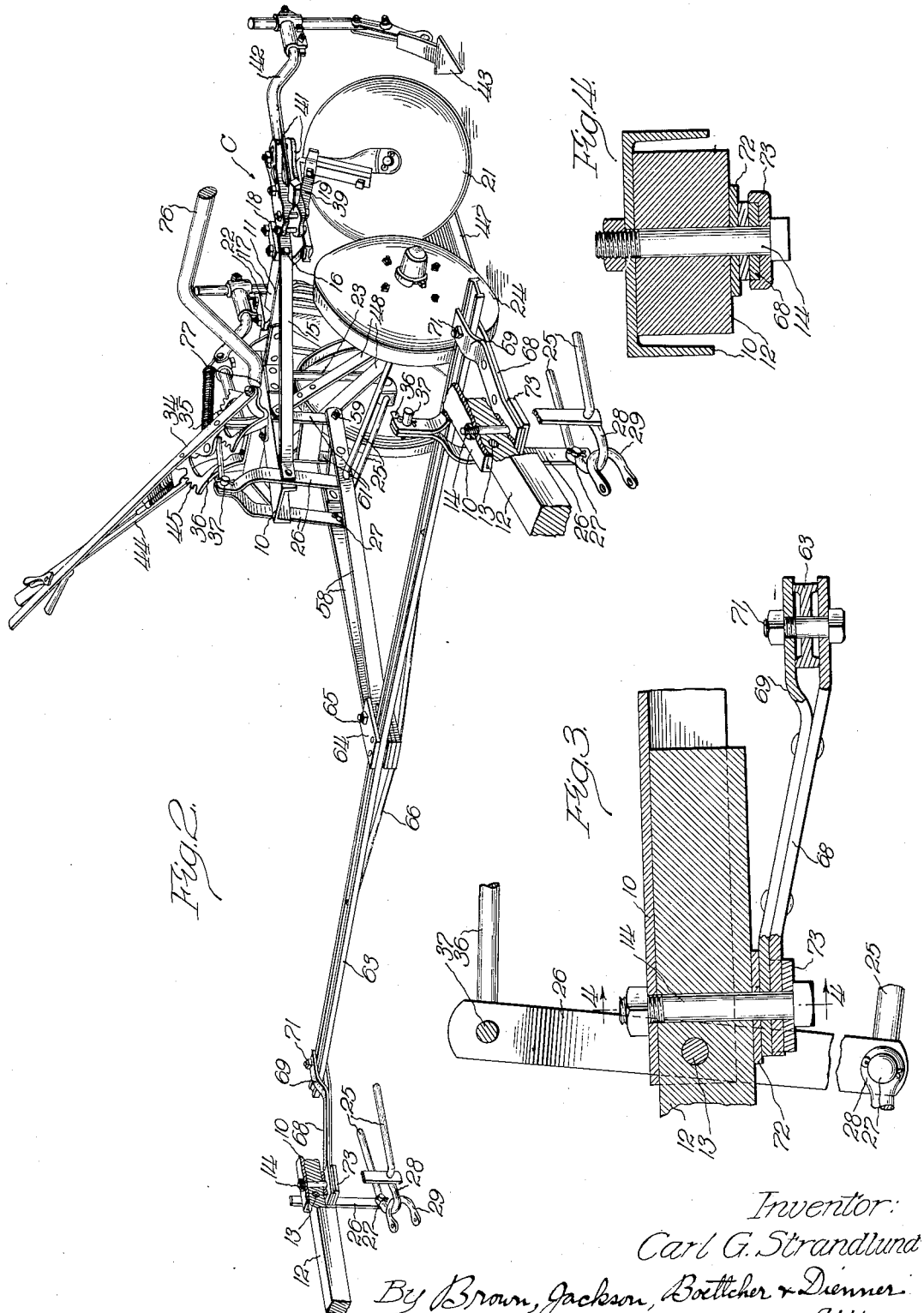

1,928,321

UNITED STATES PATENT OFFICE 1,928,321

LISTER CULTIVATOR

Carl G. Strandlund, Moline, Ill., assignor to Deere & Company, Moline, Ill., a corporation of Illinois Original application October 24, 1927, Serial No. 228,142. Divided and this application November 20, 1931. Serial No. 576,248

20 Claims. (Cl. 97—143)

This application is a division of the copending application filed by Theophilus Brown, Walter H. Silver and myself October 24, 1927, Serial No. 228,142.

The present invention relates to lister cultivators, and has particular reference to three-row implements of this type.

One of the particular objects of the invention is to provide such an implement wherein the three cultivator gangs are free to swing transversely, each independently of the others, so that each gang can follow its individual lister row The lists are usually made with an implement which only makes one or two lists at a time, owing to unsteady driving of such implement, it frequently happens that the spacing between adjacent rows will vary considerably. Accordingly, it is important in a multiple row cultivator of the present type that the separate cultivator gangs be capable of shifting laterally within certain limits, independently of each other, so that the gangs can accurately follow the lateral deviations in the rows. Such object is attained in the present construction of implement by an improved method of pivotally connecting the gangs together, which permits the two laterally disposed gangs to swing inwardly or outwardly relatively to each other, and which permits the intermediate gang to swing to either side independently of the laterally disposed gangs. Preferably, this is accomplished by pivotally connecting the intermediate gang or implement unit with a transverse draft bar which has the ends thereof carried by the outer units and connected therewith by swinging links.

Another object of the invention is to provide a lister cultivator of the above general description wherein the three cultivator gangs are disposed in staggered relation. The purpose of this is to permit the gangs to follow the deviations in the plant rows without the gangs interfering with each other; and to permit the implement to be turned at the ends of the field without the gangs colliding with each other in such turning movement. This object is preferably attained by placing the two outwardly-disposed gangs in substantially the same transverse plane and placing the intermediate gang in rear of the two outer gangs.

Another object of the invention is to provide a lister cultivator of the above general description which is further characterized by improved draft means which permits lateral deviation of the cultivator gangs in following their individual rows, while still transmitting a draft which is equalized between the several gangs. In this regard, the invention contemplates an improved arrangement of the draft parts whereby the horse draft is transmitted to the two outwardly disposed cultivator gangs, and is thence transmitted from said outer gangs to the intermediate gang.

Other objects and advantages of the invention will appear at length in the following description of a preferred embodiment thereof. In the drawings illustrating such embodiment:

Fig. 1 is a plan view in perspective of the implement;

Fig. 2 is a fragmentary front view in perspective, illustrating the draft connections for the three gangs, but with the outer gangs removed in order to illustrate the pivotal connection to the intermediate gang;

Fig. 3 is a longitudinal sectional view through the front end of one of the outer gang units and illustrating the swinging connection between the outer units and the transverse draft bar for the intermediate unit; and Fig. 4 is a transverse sectional view taken along the line 4—4 of Fig. 3.

The implement as a whole comprises three lister cultivator gangs, the two outwardly disposed gangs being designated A and B, and the intermediate or center gang being designated C. The two laterally disposed gangs A and B are substantial duplicates, with the exception that one is a left hand unit and the other a right hand unit. The intermediate gang C is similar in construction to the outer gangs A and B, only differing therefrom in the manner of establishing the draft connection with the intermediate gang and in the fact that such intermediate gang has no draft pole, as will hereinafter appear. Accordingly, I shall only describe one of these gangs in detail, and in this regard, attention is directed to the fact that these gangs correspond in their general construction to the gangs illustrated in Patent No. 1,148,613, issued to W. A. Paul on August 3, 1915.

Referring specifically to the gang or unit A, it will be noted that it comprises a frame which is built up of a longitudinally extending channel bar 10 and a transversely extending bar 11 at the rear end thereof. The transverse bar 11 extends across the rear end of the inverted channel bar 10 and is rigidly secured thereto by angle brackets or in any other suitable manner. Extending forwardly from the front end of the channel bar 10 is a draft member or pole 12, the channel bar 10 forming a socket in which the pole is rigidly secured by a horizontally extending bolt 13 (Fig. 3), which passes through the side flanges of the channel bar and through the tongue, and also by a vertical bolt 14 which passes downwardly through the web of the channel 10 and through the tongue. It will be understood that the other gang unit B also has a draft pole 12 extending forwardly therefrom, which is connected to its channel bar 10 in the same manner.

The aforementioned frame consisting of the channel bar 10 and transverse bar 11 is braced by diagonally extending brace bars or rods 15 which are connected at their forward ends to the horizontally extending bolt 13. The rear ends of these diagonal brace bars are bent rearwardly and are provided with openings to receive bolts 16 which connect the ends of the bars 11 and 15. The bolts 16 also constitute pivots on which a tool carrying frame is pivotally mounted. Such tool carrying frame comprises primarily a tubular bar 17, preferably of square cross-section. Secured to the opposite ends of such bar are clamp devices or bracket members 18 which are clamped to the outer surface of the bar and which have forwardly extending pivot eyes having pivotal mounting on the bolts 16. Thus the tool carrying bar 17 and the frame 10—11 are capable of vertical pivotal movement relative to each other about the axis of the bolts 16.

Pivotally connected to the under sides of the two brackets 18, for horizontal swinging movement, are rearwardly extending arms 19 which carry suitable earth working tools at their rear ends. In the arrangement shown, I have illustrated discs 21 as being mounted on the arms 19, but it will be evident that shovels or any other desired type of earth working devices may be mounted on these arms in lieu of the discs 21. The arms 19 are adapted to be swung inwardly or outwardly to vary the distance between the earth working tools carried thereby, and to be clamped in any adjusted position by a suitable arrangement of clamping bolt engaging in a curved slot in the bracket 18, the details of which need not be described as they are old and well-known. It will also be understood that the earth working tools can be set at different angles with respect to their supporting arms 19.

Secured in spaced relation to the intermediate portion of the tubular bar 17 are two clamping devices 22 from which depend vertical standards 23. The lower ends of these two standards have outwardly extending axle spindles upon which are journaled bell wheels 24—24, which straddle the plant row and which support the tool carrying bar 17. Connected to the wheel carrying standards 23, at points preferably adjacent to the outwardly extending spindle portions, are links 25 which extend upwardly and forwardly to a pivoted yoke 26. For the outer units such yoke comprises two spaced straps 26 which extend down on the opposite sides of the channel bar 10, being pivotally connected thereto by the bolt 13 (Fig. 3) which extends through both straps 26. Said straps extend down below the channel bar 10 and have their lower ends apertured to receive the ends of the links 25, such links having inwardly turned ends 27 which project through the apertures in the straps from the outer sides of the straps. Pivotally mounted upon such inwardly turned ends, between the straps 26, is a clevis 28 with which a second clevis 29 is linked. The latter clevis has pivotal connection with a doubletree comprising an evener bar 31, to the outer ends of which singletrees 32 are pivotally connected. It will thus be seen that draft energy effective on the evener bar 31 is transmitted to the lower ends of the straps or yoke members 26, and thence through the links 25 to the bell wheels 24 and to the earth working tools carried by the gang.

The yoke member 26 is held against swinging movement with this draft pull through the instrumentality of a lever 34 which is pivotally supported on a suitable pivot bracket mounted on the upper side of the channel bar 10. The lever carries any suitable latch mechanism adapted to cooperate with a latching sector 35, which sector is formed as part of the pivot bracket on which the lever is mounted. A link 36 is pivotally connected to said lever and extends forwardly for effecting pivoted connection at 37 with the upper end of the yoke 26. The upper ends of the two straps which form said yoke are brought together and the transversely bent end 37 of the link 36 is passed through openings in such ends of the straps. It will be evident from the foregoing that by shifting the lever 34 fore and aft the yoke 26 will be rocked on the bolt 13 as a pivot, which will shift the links 25 and thus swing the bell wheels fore and aft about the pivot bolts 16, thereby swinging the tubular frame bar 17 to move the soil engaging tools 21 into or out of engagement with the ground.

Extending through the tubular bar or shaft 17, and rotatable therein, is a second tool carrying shaft 39. The outer ends of the latter shaft are preferably formed square to have brackets 41 firmly clamped thereon. Bars or arms 42 extend rearwardly from the brackets 41 and carry suitable earth working tools 43. In the arrangement shown, we have illustrated these earth working tools as being shovels, but it will be evident that discs or any other desired type of cultivating devices may be mounted on the arms 42 instead of these shovels. Provision is made for adjusting the two arms 42 of each gang or unit inwardly or outwardly with respect to the unit so as to vary the distance between the earth working tools carried thereby, each such adjustment being secured by a suitable clamping bolt carried by the arm which effects clamping engagement in a curved slot in the bracket 41. This adjustment corresponds more or less to the adjustment provided for the arms 19, and need not be described in detail as it is old and well-known.

The second set of cultivating devices 43, carried by the arms 42, may be given different depth adjustments relative to the first set of cultivating devices 21 through actuation of a lever 44. This lever is fixedly secured to the inner tool carrying shaft 39 on which the brackets 41 are mounted, and said lever is adapted to have latched engagement with a notched sector 45 which is illustrated as being formed integral with the clamping bracket 18. As previously described, such clamping bracket is secured fast to the outer tubular shaft or bar 17, and hence the latched engagement of the lever 44 with the sector 45 will hold the two shafts 17 and 39 in fixed relation to each other. It will be seen from the foregoing that when the lever 34 is actuated the wheel support comprising the bell wheels 24 and their standards 23, will be shifted fore and aft, and in such movement will raise or lower both sets of cultivating devices 21 and 43, which cultivating devices are carried by the wheel support. It will also be seen that by moving second lever 44 fore and aft an independent depth adjustment can be given the second set of cultivating devices 43, or these cultivating devices can be raised and lowered for the purpose of shaking trash out of the shovels 43.

Disposed between the two supporting wheels of each gang or unit is a shield 47 which serves to cover the young plants in the bottom of the trench or list, so as to prevent the plants from being covered by the soil or otherwise injured in the cultivating operation. Such shield consists of an inverted angle shaped member, and has draft connection with its gang or unit through the medium of upwardly extending bars 48 which are pivotally connected to the sides of the channel bar 10, as best shown in Fig. 2. Said shield is also connected to the tool carrying arms 19 through chains 49.

The stabilizing means for the two outer gangs or units A and B comprises a transversely extending bar 51 and laterally swinging arms or links 52 which pivotally connect the outer portions of the stabilizing bar 51 with the gang units A and B. Each arm or link 52 has a downwardly extending bearing portion, indicated at 53 in Fig. 1, which bearing portion extends down into a vertical bearing socket formed in a bracket or plate 54 which is secured to the rear end of the frame channel 10. A relatively long area of bearing engagement is afforded between the bearing portion 53 and the bracket 54 so as to resist twisting stresses set up between the cultivator unit and the arm 52 incident to any tipping tendency of the cultivator unit.

Secured to the intermediate portion of the stabilizing bar 51 is the operator's seat 57, from which position the operator can conveniently reach the levers 34 and 44 of the gangs.

The structure which I have thus far described corresponds to a conventional two-row lister cultivator of the type disclosed in the Paul patent previously referred to. Referring now to the connection and operative association of the intermediate cultivator gang C with the two outer gangs A and B, it will be seen from Fig. 1 that the intermediate gang is disposed considerably in rear of the transverse plane of the two outer gangs. Such location of the intermediate gang permits all three gangs to swing laterally in following the deviations in the plant rows without interference between the gangs; and also permits the implement to be turned at the ends of the field without the gangs colliding with each other in such turning movement.

As previously remarked, the intermediate gang is in all material respects a duplicate of the outer gangs A and B, only differing therefrom in its draft connections. These draft connections per se do not form any part of the present invention and for a detailed description reference may be had to the copending application identified above or the copending application of Walter H. Silver, filed November 20, 1931, Serial No. 576,234. For the purposes of the present description, therefore, it suffices to note that the intermediate gang comprises the frame channel 10 and the pivotally mounted yoke 26, similarly to the outer gangs. Pivotally connected to the outer sides of the yoke bars 26 are a pair of forwardly extending draft members 58. The links 25 have their inwardly turned ends 27 passing through such draft members 58, and through the lower ends of the yoke bars 26, so that the draft pull on the members 58 is transmitted to the links 25, as described of the outer gangs. The draft members 58 extend back beyond the yoke 26 and have their rear ends pivotally connected at 59 to links 61 which extend down from the frame bar 10, such links being pivotally supported on the frame bar to swing with the yoke 26. Thus the draft members 58 have pivotal connection with the frame bar 10 for the center unit through a system of parallel links, which permits of fore and aft swinging of the wheel support through actuation of the lever 34, as previously described of the outer gangs.

The front ends of the draft members 58 have pivotal attachment to the center of a transversely extending draft transmitting structure or draft bar 63. Such pivotal attachment is preferably effected by securing spaced plates 64 to the upper and lower sides of the draft bar, and extending these plates rearwardly therefrom to support a vertical pivot bolt 65. The draft members 58 have looped engagement around the pivot bolt 65 between the plate 64, so that the intermediate gang 6 is free to swing laterally with reference to the draft bar 63, around the axis of the bolt 65. A truss rod 66 is preferably extended along the bottom of the draft bar 63, such truss rod having its ends secured to the draft bar and having its intermediate portion secured to the lower plate 64.

The draft which is transmitted to the two outer gangs through the doubletrees 31 is in turn transmitted to the outer ends of the draft bar 63 through swingable draft links 68. As best shown in Fig. 3, each of these draft links consists of two bars riveted together and having their ends separated to form a clevis 69 which engages over the upper and lower sides of the draft bar 63. A pivot bolt 71 is extended through alined holes in the clevis 69 and in the draft bar. The front end of each link 68 is pivotally connected to the under side of the adjacent draft pole 12 on the vertical bolt 14, such bolt passing down through an opening in the end of the link 68. A washer or wear plate 72 is interposed between the link and the under side of the pole 12, and a clip or washer 73 is interposed between the head of the bolt 14 and the under side of the draft link, such clip or washer 73 having side flanges which engage the sides of the link, as best shown in Fig. 4. It will be apparent that the swinging link connection between the ends of the draft bar 63 and the two outer gangs A and B will transmit an equalized draft between the three gangs while still permitting each gang to swing or shift transversely in following its lister row. That is to say, by virtue of the pivoted link connection between the outer ends of the draft bar 63 and the outer gangs, relative transverse shifting movement can occur between the draft bar and the gangs so as to permit the two outer gangs to swing inwardly or outwardly, or to permit the intermediate gang to swing to either side, all independently of each other.

The stabilizing means for the intermediate gang C comprises a stabilizing bar or link 76 which extends diagonally forwardly from the intermediate unit to one end of the transverse stabilizing bar 51. The rear end of the stabilizing bar 76 has a downwardly extending bearing portion 77 which extends down into the vertical bearing socket formed in the bracket 54 of the gang frame. Thus the rear end of the bar 76 has pivotal attachment with the intermediate unit, similarly to the pivotal attachment of the arms 52 with the laterally disposed units A and B. The front end of the stabilizing bar 76 has a downwardly extending bearing portion 78 which has bearing engagement in a tubular socket 79 carried on the end of the transverse stabilizing bar.

The stabilizing means for the intermediate gang as well as for the outer gangs do not per se form any part of the present invention, and for further details reference may be had to the first copending application above identified.

It will be evident from the foregoing that the rearwardly extending stabilizing bar 76 will hold the intermediate unit C against lateral tipping, while still permitting lateral deviation of such unit in following the lister row. In such lateral movement, the transverse stabilizing bar 51 will be shifted endwise to one side or the other, on the freely swinging arms 52. Such movement of the transverse stabilizing bar will carry the operator's seat 57 in a direction corresponding to the lateral movement of the intermediate gang, so that irrespective of the degree of such lateral movement the operator will always be able to reach the levers 34 and 44 of such unit conveniently.

It will be seen from the foregoing that I have provided a three-row lister cultivator wherein each cultivator unit has flexible connection with the draft means to the end of permitting each cultivator unit to shift or swing transversely, relatively to the other units, in following its lister row.

What I claim as my invention and desire to secure by Letters Patent is:

1. A lister cultivator comprising two outer gangs and an intermediate gang, a transverse member supported by said outer gangs for transverse movement relative thereto, means providing a pivot point carried by said member, and means pivotally connecting said intermediate gang for horizontal swinging about said pivot point.

2. A lister cultivator comprising two outer gangs and an intermediate gang, a draft transmitting structure supported at least partially on said outer gangs for transverse movement relative thereto, and means pivotally connecting the intermediate gang to a portion of said transverse draft transmitting structure for pivotal movement in a substantially horizontal plane.

3. A lister cultivator comprising a pair of outer cultivator gangs and an intermediate cultivator gang, a transversely extending draft transmitting member supported at least partially by said outer gangs for transverse movement relative thereto, and means connected with said draft transmitting structure and providing a pivot point to which the forward portion of said intermediate gang is connected to be carried thereby and to provide for transverse swinging of said intermediate gang.

4. A lister cultivator comprising two outer gangs and an intermediate gang, forwardly extending draft members carried by the outer gangs, a transverse draft transmitting element movably carried by said forwardly extending draft members, and means movably connecting the intermediate gang with said transverse draft transmitting element.

5. A lister cultivator comprising two outer gangs and an intermediate gang, forwardly extending tongues carried by said outer gangs, a transverse draft bar movably carried by said tongues, and means pivoting the intermediate gang to an intermediate portion of said draft bar whereby draft is transmitted to said intermediate gang.

6. A lister cultivator comprising two outer gangs having forwardly extending draft members and an intermediate gang, a draft bar extending transversely of said outer gangs and connected with said intermediate gang, and means movably supporting said draft bar on the draft members of said outer gangs whereby draft may be transmitted from the latter to said intermediate gang.

7. A lister cultivator comprising two outer gangs having longitudinally extending draft members and an intermediate gang, a draft bar extending transversely of said outer gangs and pivotally connected with said intermediate gang to transmit draft thereto, and means movably supporting said draft bar below the horizontal plane of said draft members whereby draft is transmitted from the latter to said draft bar.

8. A lister cultivator comprising two outer gangs and an intermediate gang, draft means for the outer gangs and swingable supporting means carried thereby, and draft means for the intermediate gang comprising a transverse member connected with said swingable supporting means of said draft means of the outer gangs to be supported thereby for transverse bodily movement with respect thereto.

9. A lister cultivator comprising two outer gangs and an intermediate gang, draft means for the outer gangs, and draft means for the intermediate gang comprising a transverse member connected with the draft means of the outer gangs through a pair of links connected at one end to the draft means of the outer gangs respectively and to the opposite ends of the transverse member at the other end.

10. A lister cultivator comprising two outer gangs and an intermediate gang, draft means for the outer gangs, and draft means for the intermediate gang comprising a transverse member connected with the draft means of the outer gangs through a pair of links connected at one end to the draft means of the outer gangs respectively and to the opposite ends of the transverse member at the other end, the intermediate gang being pivotally connected to the transverse member.

11. A lister cultivator comprising two outer gangs and an intermediate gang, separate draft means for the outer gangs, a transverse draft member connected with the intermediate gang to transmit draft thereto, and means extending longitudinally of said separate draft means for the outer gangs for movably connecting the outer gangs with said transverse draft member.

12. A lister cultivator comprising two outer gangs and an intermediate gang, separate draft means for the outer gangs extending substantially longitudinally of the cultivator, a transverse draft bar connected with said intermediate unit to transmit draft thereto, and means for movably connecting the ends of said draft bar to said longitudinal draft means, said connecting means being disposed below said longitudinal draft means and having forwardly and upwardly extending portions in connection therewith.

13. A lister cultivator comprising two outer gangs and an intermediate gang, each of said outer gangs being provided with a longitudinally extending draft member, a transverse draft bar pivotally connected with said intermediate gang to transmit draft thereto, said draft bar being laterally shiftable with respect to said outer units to provide for lateral shifting and pivotal movement of said intermediate gang relative to said outer gangs, and means for connecting the outer ends of said draft bar with the longitudinal draft members of said outer gangs, said means comprising a pair of interconnected straps each having an end connected with one of said longitudinal draft members.

14. A lister cultivator comprising two outer gangs and an intermediate gang, said outer gangs being provided with forwardly extending draft members, a transverse draft bar pivotally connected near its central portion with the intermediate gang, and swinging links supporting said draft bar from the draft members for said outer units.

15. A lister cultivator comprising two outer gangs and an intermediate gang, a transverse draft bar shiftable laterally with respect to said outer gangs and connected adjacent its central portion with said intermediate gang, and swinging links pivotally connected adjacent one end with the outer ends of said transverse draft bar and provided with upwardly extending portions, said last named portions of said swinging links being connected respectively with said draft members for the outer units.

16. A lister cultivator comprising two outer gangs and an intermediate gang, each of said gangs being provided with a forwardly extending draft member, a transverse draft bar movably supported on the draft members for said outer gangs, and means connecting said draft bar with the draft member for the intermediate gang to transmit draft to the latter.

17. A lister cultivator comprising two outer gangs and an intermediate gang, each of said gangs having longitudinally extending draft members, a laterally shiftable transverse draft bar, a pair of longitudinally and upwardly extending draft links pivotally connecting the outer ends of said transverse draft bar with the draft members for the outer units and supporting the transverse draft bar thereby, and means pivotally connecting the draft member for the intermediate unit with said transverse draft bar whereby each gang is capable of pivotal and shiftable movement with respect to each of the other gangs.

18. A lister cultivator comprising two outer gangs and an intermediate gang, separate draft means for the outer gangs, a transverse draft member connected with the intermediate gang to transmit draft thereto, and means shiftably connected with said separate draft means for the outer gangs for movably connecting the outer gangs with said transverse draft member.

19. A lister cultivator comprising two outer gangs and an intermediate gang, each of said outer gangs being provided with a longitudinally extending draft member, a transverse draft bar pivotally connected with said intermediate gang to transmit draft thereto, said draft bar being laterally shiftable with respect to said outer units to provide for lateral shifting and pivotal movement of said intermediate gang relative to said outer gangs, and means for connecting the outer ends of said draft bar with the longitudinal draft members of said outer gangs, said means including a pair of interconnected members pivotally connected with the longitudinal draft members of the outer gangs.

20. A lister cultivator comprising two outer gangs and an intermediate gang, said outer gangs being provided with forwardly extending draft members, a transverse draft bar pivotally connected near its central portion with the intermediate gang, and means including a pair of swinging links movably connected with each of said forwardly extending draft members for supporting the draft bar from the draft members for said outer units.

CARL G. STRANDLUND.